United States Patent [19]
Suzuki et al.

[11] 3,816,680
[45] June 11, 1974

[54] ACCELERATION RESPONSIVE SWITCH

[75] Inventors: Masaru Suzuki, Chiryu; Masayoshi Iwata, Hajima; Takeo Matsui, Gifu, all of Japan

[73] Assignee: Kabushiki Kaisha Tokai Rika Denki Seisakusho, Nishi-Kasugai-gun, Aichi-Pref., Japan

[22] Filed: Nov. 20, 1972

[21] Appl. No.: 308,249

Related U.S. Application Data

[62] Division of Ser. No. 173,711, Aug. 18, 1971, Pat. No. 3,723,680.

[52] U.S. Cl... 200/61.51, 200/DIG. 029, 200/61.52, 200/166 B
[51] Int. Cl. .......................................... H01h 35/14
[58] Field of Search..... 200/DIG. 029, 61.11, 61.41, 200/61.42, 61.43, 61.45 R, 61.48, 11 K, 166 BB, 61.51, 61.52, 166 B

[56] References Cited
UNITED STATES PATENTS

| | | | |
|---|---|---|---|
| 1,662,979 | 3/1928 | Nelson | 200/DIG. 029 UX |
| 3,024,334 | 3/1962 | Rhodes | 200/11 K X |
| 3,180,952 | 4/1965 | Preisz | 200/61.48 |
| 3,437,770 | 4/1969 | Piernik | 200/61.45 R X |
| 3,644,921 | 2/1972 | Duggan et al. | 200/61.45 R X |

*Primary Examiner*—James R. Scott
*Attorney, Agent, or Firm*—Woodhams, Blanchard and Flynn

[57] ABSTRACT

An acceleration responsive switching device which comprises a casing having, at its bottom portion, a reverse cone-shaped inner wall, a weight ball movably put in the casing and normally positioned on said reverse cone-shaped inner wall at its central portion, a switch means provided in the casing at the center of the bottom portion and being normally in contact with said weight ball and adapted to be disengaged from the contact with said ball when the ball is upwardly moved along an inclined face of said reverse cone-shaped inner wall due to a preselected acceleration.

6 Claims, 4 Drawing Figures

ACCELERATION RESPONSIVE SWITCH

This is a division, of application Ser. No. 173,711, filed Aug. 18, 1971, now U.S. Pat. No. 3,723,680.

This invention relates to a switching device, and more particularly to a switching device adapted to be provided in a movable body such as a motor car and actuated responsive to an acceleration exceeding a predetermined level.

Recently, rapid increase of road vehicles has incurred many traffic accidents. In order to avoid such accidents, safety devices such as safety belt and air bag provided in a motor car have been put into practical use. Of such safety devices, the rolling-up type safety belt and the air bag respectively employ a locking device and an exploder device which are adapted to detect an acceleration of the motor car.

In known forms of acceleration responsive switching devices, especially in those utilizing a weight ball, the weight ball having a magnetic permeability is used to detect an acceleration by making use of magnetic flux change caused by movement of the weight ball. Such conventional devices require a number of parts and are complicated in structure, leading to high cost of manufacturing. Such conventional devices need also a relatively long time to detect an acceleration and are lack of instant responsiveness.

An object of this invention is to provide an acceleration responsive switching device which is simple in construction and exactly and instantaneously responsive to the acceleration.

Another object of this invention is to provide an acceleration responsive switching device of the character described, which requires a reduced number of elements or parts in constructions.

These and other objects, features and advantages will be apparent to those skilled in the art from the following detailed description and the appended claims.

Essentially, according to the present invention, there is provided an acceleration responsive switching device which comprises a casing having, at its bottom portion, a reverse cone-shaped inner wall, a weight ball movably put in the casing and normally positioned on said reverse cone-shaped inner wall at its central portion, a switch means provided in the casing at the center of the bottom portion and being normally in contact with said weight ball and adapted to be disengaged from the contact with said ball when the ball is upwardly moved along an inclined face of said reverse cone-shaped inner wall due to an acceleration given.

This invention will now be more particularly described with reference to the accompanying drawings in which.

Like portions and parts are designated by like numerals in FIGS. 1 to 4.

Figure 1:
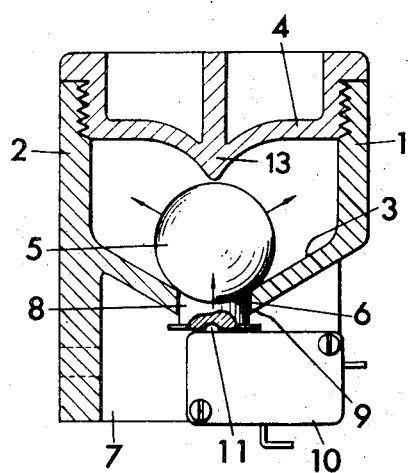
FIG. 1 shows a vertically sectioned elevation of an acceleration responsive switching device embodying this invention.
Figure 2:
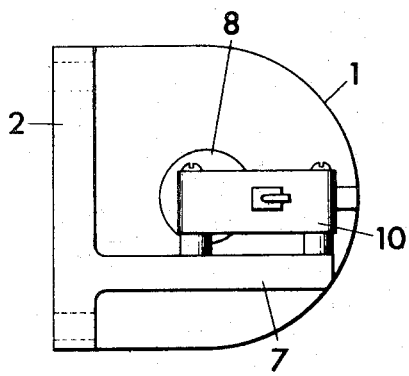
FIG. 2 is a bottom view of the device shown in FIG. 1.

Referring now to FIGS. 1 and 2, there is shown an acceleration responsive switching device which comprises a cylindrical casing 1 having, at its bottom portion, a reverse cone-shaped inner wall 3. The casing 1 is closed with a closure 4 threadedly fitted into said casing 1. The casing 1 has also a mounting plate 2 connected integrally therewith at the outer cylindrical side wall and adapted to be mounted on a vertical plane in the interior of a motor car at a suitable place.

In the interior of the casing 1 is movably put in a weight ball 5 which is normally positioned on the inner wall 3 of the bottom at its lowest or central portion.

The casing 1 is provided with a vertical opening 6 at the central portion of the bottom wall. Into said vertical opening 6 is slidably inserted a pushing rod 8 for movement in vertical derections. The pushing rod 8 has an upper surface 9 of a spherical shape to be snugly in contact with spherical surface of the weight ball 5 put in the casing 1. In the normal position, the upper surface of the pushing rod 8 forms a part of the inner surface of the bottom wall. Said pushing rod 8 has also a bottom which is supported on a self-returning push button 11 and is provided at its center with a small hole to be engaged with the upper end of said self-returning push button 11 which extends from a microswitch 10 fixedly mounted on a suitable place, for example on a support plate 7 as shown in FIGS. 1 and 2. The support plate 7 is formed integrally with the casing 1 and the casing mounting plate 2, and extends from both of the bottom wall and said casing mounting plate in a vertical plane at a distance from the hole 6.

The closure 4 in the casing has an inner wall having a profile to leave a space in the casing 1 to allow the weight ball to slide upwardly along the inclined face of the bottom wall. The inner wall of the closure 4 has at its central portion a downwardly projecting part 13 which prevents the weight ball from jumping up at the central position. The closure 4 is similarly constructed and functions in another embodiment as in FIGS. 3 and 4.

In operation, when an acceleration is given to a device-carrying motor car in a direction perpendicular to the vertical axis of the casing 1, namely in a horizontal direction, the weight ball 5 is slidingly moved upwardly along the inclined face 3 of the bottom wall. Then, the weight ball 5 moves from the upper surface 9 of the pushing rod 8. As a result, a pushing force is released from the rod 8. Therefore the pushing rod 8 is urged upwardly by the returning force of the push button 11 to allow the latter to move upwardly, whereby off-operation of the switch is completed. Once the acceleration decreases below a predetermined level, the weight ball 5 moves downwardly to give a pushing force onto the upper surface of the pushing rod 8. The pushing rod 8 is pushed down to in turn urge the push button 11 downwardly, whereby the microswitch is caused to turn on (normal position).

Figure 3:
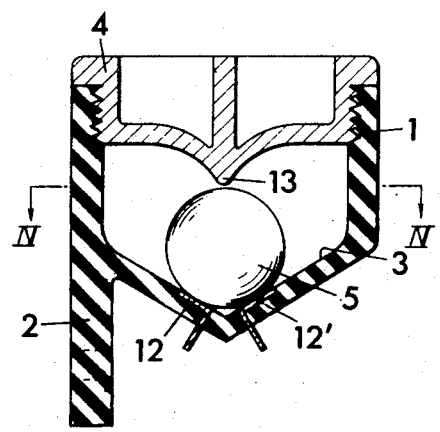
FIG. 3 shows a vertically sectional elevation of another acceleration responsive switching device embodying this invention.
Figure 4:
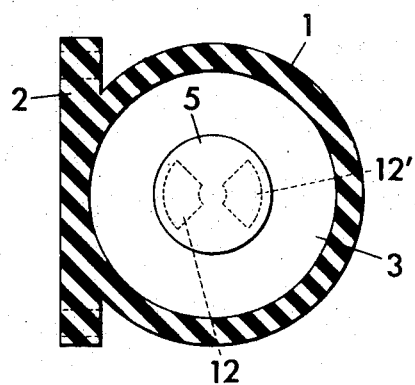
FIG. 4 is a sectional view of the device shown in FIG. 3 taken along the line IV — IV.

FIG. 3 and 4 show another embodiment of this invention. The illustration of the same components or parts as employed in the foregoing embodiment is omitted to avoid repetition.

The casing 1 is not necessary to be provided with members such as the support plate 7 and the central opening as shown in FIG. 1. Instead, there are employed, at the bottom wall of the casing, two or more electric contacts 12, 12' connected to an electrical circuit (not shown) as depicted. The upper ends of the electric contacts are placed closely onto the inner face 3 and normally in contact with the weight ball 5. In operation, a horizontal acceleration is given to a device-carrying motor car to move the weight ball 5 in the same manner as described referring to FIG. 1 and 2 and when the acceleration exceeds a predetermined level the weight ball 5 is caused to disengage from the connection with at least one of the electric contacts 12, 12' whereby the electrical circuit which is closed through the electric contacts 12, 12' and the weight ball 5 of electrical conductive material is now forced to open. With a drop of acceleration, the weight ball 5 is returned into contact with the contact surfaces of both electric contacts 12, 12'.

What is claimed is:

1. An acceleration responsive switch device, comprising:

casing means including a bottom wall portion of electrically nonconductive material having an upwardly facing and upwardly diverging conical support surface;

a ball of electrically conductive material movably supported on said support surface, the weight of said ball normally maintaining same at the apex of said conical support surface;

electrical switch means adapted to be actuated by said ball when same is moved toward or away from said apex, said switch means including a pair of spaced electrical contacts mounted on said bottom wall portion adjacent said apex and positioned for engagement with said ball when said ball is located at said apex, whereby said ball electrically connects said contacts for closing said switch means when said ball is located at said apex; and said casing means including upper wall means disposed above and spaced from said bottom wall portion so as to define a space therebetween in which is positioned said ball when said ball is located at said apex, said upper wall means being disposed closely adjacent said ball when same is positioned at said apex for preventing said ball from moving vertically upwardly away from said support surface.

2. A switch device according to claim 1, wherein said upper wall means comprises a projection fixedly secured to said casing means and projecting downwardly toward said apex and being spaced sufficiently above said apex to enable said ball to be freely located at said apex.

3. A switch device according to claim 1, wherein said upper wall means is disposed above and spaced from said bottom wall partition so as to define a chamber therebetween in which is positioned said ball, said upper wall means having projection means fixedly secured thereto and projecting downwardly therefrom toward said apex, said projection means being disposed closely adjacent said ball when same is positioned at said apex for preventing said ball from moving vertically upwardly away from said support surface.

4. In an acceleration responsive switch device which is responsive to a substantially horizontally imposed acceleration, said device comprising:

casing means including a bottom wall portion of electrically nonconductive material having an upwardly facing and upwardly diverging conical support surface, said casing means also having a side wall portion fixed relative to said bottom wall portion and extending upwardly from the radially outer edge of said conical support surface in surrounding relationship thereto;

a ball of electrically conductive material rollingly supported on said support surface, the weight of said ball normally maintaining same at the apex of said conical support surface, said ball having a diameter substantially smaller than the diameter of said conical support surface adjacent the radially outer edge thereof; and electrical switch means adapted to be actuated by said ball when same is moved toward or away from said apex, said switch means including a pair of spaced electrical contacts fixedly mounted on said bottom wall portion adjacent said apex and positioned for simultaneous engagement with said ball when said ball is located at said apex, said contacts being substantially flush with said conical support surface and being spaced radially inwardly a substantial distance from the radially outer edge of said conical support surface, whereby said ball electrically connects said contacts for closing said switch means when said ball is located at said apex.

5. In a switch device according to claim 4, further including means coacting with said casing means for confining said ball in the immediate vicinity of said conical support surface for causing said ball to move outwardly along said support surface in response to imposition of a substantially horizontally oriented acceleration on said switching device, said confining means preventing said ball from jumping vertically upwardly away from said conical support surface.

6. In a switching device according to claim 5, wherein said bottom wall portion is substantially solid and wherein said conical support surface has a generatrix defined by a straight line.

* * * * *

UNITED STATES PATENT OFFICE
CERTIFICATE OF CORRECTION

Patent No. 3,816,680                    Dated June 11, 1974

Inventor(s) Masaru Suzuki, Masayoshi Iwata and Takeo Matsui

It is certified that error appears in the above-identified patent and that said Letters Patent are hereby corrected as shown below:

In the heading, insert: ---Foreign application Priority Data:

Aug. 21, 1970   Japan .... 45-83711

Feb. 20, 1971   Japan .... 46-9779---.

Col. 3, line 49; change "partition" to ---portion---.

Col. 4, line 47; change "Claim 5" to ---Claim 4---.

Signed and sealed this 1st day of October 1974.

(SEAL)
Attest:

McCOY M. GIBSON JR.                    C. MARSHALL DANN
Attesting Officer                      Commissioner of Patents